United States Patent
Doumaux et al.

(10) Patent No.: US 11,065,871 B2
(45) Date of Patent: *Jul. 20, 2021

(54) DYE SUBLIMATION INK THERMAL INKJET PRINTING METHOD

(71) Applicant: Hewlett-Packard Development Company, L.P., Spring, TX (US)

(72) Inventors: Howard Doumaux, San Diego, CA (US); Steven M. Krause, San Diego, CA (US); Varna Jayne Lindqvist, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/647,868

(22) PCT Filed: Nov. 8, 2017

(86) PCT No.: PCT/US2017/060688
§ 371 (c)(1),
(2) Date: Mar. 16, 2020

(87) PCT Pub. No.: WO2019/094009
PCT Pub. Date: May 16, 2019

(65) Prior Publication Data
US 2020/0276813 A1 Sep. 3, 2020

(51) Int. Cl.
*B41J 2/14* (2006.01)
*B41J 2/21* (2006.01)

(52) U.S. Cl.
CPC ......... *B41J 2/14016* (2013.01); *B41J 2/2107* (2013.01)

(58) Field of Classification Search
CPC ....... C09D 11/54; C09D 11/30; C09D 11/102; C09D 11/107; C09D 11/322;
(Continued)

(56) References Cited

U.S. PATENT DOCUMENTS 4,689,078 A 8/1987 Koike et al.
5,830,263 A 11/1998 Hale et al.
(Continued)

FOREIGN PATENT DOCUMENTS

JP       S61118477       6/1986
WO    WO-2006130348   12/2006
WO    WO-2016171724   10/2016

OTHER PUBLICATIONS

Savastano, David, "New Technologies for Digital Textile Printing", Aug. 4, 2016, 7 pgs, www.inkworldmagazine.com.
(Continued)

*Primary Examiner* — Manish S Shah
(74) *Attorney, Agent, or Firm* — Dierker & Kavanaugh PC (57) ABSTRACT

A printing method includes selecting a dye sublimation ink, having: a disperse dye colorant dispersion; a primary solvent selected from the group consisting of glycerol, ethoxylated glycerol, 2-methyl-1,3-propanediol, dipropylene glycol, and combinations thereof; a surfactant selected from the group consisting of nonionic surfactants, anionic surfactants, and combinations thereof; an additive selected from the group consisting of a buffer, a biocide, a chelating agent, and combinations thereof; and a balance of water. An operating energy that includes a margin over a turn-on energy (TOE) for a thermal inkjet printhead is applied to a heating resistor of the printhead, wherein the margin ranges from about 10% to about 25% over the TOE. The dye sublimation ink is printed from the thermal inkjet printhead i) directly onto a textile substrate, or ii) onto a transfer medium to form an image thereon; and the image is transferred onto the textile substrate.

15 Claims, 7 Drawing Sheets

(58) Field of Classification Search
CPC ..... C09D 11/326; C09D 11/03; C09D 11/037; C09D 11/033; C09D 11/36; C09D 11/40; C09D 11/38; C09D 11/32; C09D 11/324; C09D 11/328; C09D 11/101; C09D 11/005; C09D 11/52; C09D 11/106; D06P 1/0032; D06P 1/0096; D06P 5/001; D06P 5/02; D06P 5/2011; D06P 5/2077; D06P 5/2083; D06P 5/30; B41J 3/4078; B41J 11/06; B41J 23/042; B41J 23/0436; B41J 25/001; B41J 25/34; B41J 25/003; B41J 25/312; B41J 2025/008; B41J 2202/21; B41J 2/17596; B41J 2/16508; B41J 2/1652; B41J 2/15; B41J 2/17563; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; Y10T 428/24802
See application file for complete search history.

(56) References Cited

U.S. PATENT DOCUMENTS

| | | | |
|---|---|---|---|
| 6,302,507 | B1 | 10/2001 | Prakash et al. |
| 6,607,268 | B2 | 8/2003 | Bruinsma et al. |
| 7,585,047 | B2 | 9/2009 | Silverbrook |
| 9,630,404 | B2 | 4/2017 | Pervan et al. |
| 2003/0081028 | A1 | 5/2003 | Feinn et al. |
| 2012/0162332 | A1 | 6/2012 | McKean et al. |
| 2013/0205517 | A1* | 8/2013 | Oguchi ............... C09D 11/326 8/471 |
| 2015/0275012 | A1 | 10/2015 | Ikeda et al. |
| 2016/0208435 | A1 | 7/2016 | Oguchi et al. |
| 2019/0153669 | A1* | 5/2019 | Tani .................... B41J 2/17506 |

OTHER PUBLICATIONS

Shell, Johnny, "Digital Textile Inkjet Printing: Current State of Technology", SGIA Winter 2017—Journal Garment Edition, 4 pages, www.signidustry.com.

* cited by examiner

```
┌─────────────────────────────────────────────────────────────────────┐
│ Selecting a Dye Sublimation Ink, Including:                         │
│                                                                     │
│   A Disperse Dye Colorant Dispersion;                               │
│                                                                     │
│   A Primary Solvent Selected from the Group Consisting of Glycerol, │
│   Ethoxylated Glycerol, 2-Methyl-1,3-Propanediol, Dipropylene       │
│   Glycol, and Combinations thereof;                                 │
│                                                                     │
│   A Surfactant Selected from the Group Consisting of Nonionic       │
│   Surfactants, Anionic Surfactants, and Combinations thereof;       │
│                                                                     │
│   An Additive Selected from the Group Consisting of a Buffer,       │
│   a Biocide, a Chelating Agent, and Combinations thereof; and       │
│                                                                     │
│   A Balance of Water                                                │
└─────────────────────────────────────────────────────────────────────┘ — 102
                                  │
                                  ▼
┌─────────────────────────────────────────────────────────────────────┐
│ Applying to a Heating Resistor of a Thermal Inkjet Printhead an     │
│ Operating Energy that Includes a Margin Over a Turn-On Energy (TOE) │
│ for the Printhead, wherein the Margin Ranges from about 10% to      │
│ about 25% over the TOE                                              │
└─────────────────────────────────────────────────────────────────────┘ — 104
                    │                                │
                    ▼                                ▼
┌──────────────────────────────┐   ┌──────────────────────────────────┐
│ Thermal Inkjet Printing,     │   │ Thermal Inkjet Printing, From    │
│ From the Thermal Inkjet      │   │ the Thermal Inkjet Printhead,    │
│ Printhead, the Dye           │106│ the Dye Sublimation Ink Onto a   │108
│ Sublimation Ink Directly     │   │ Transfer Medium to Form an Image │
│ Onto a Textile Substrate     │   │ On the Transfer Medium           │
└──────────────────────────────┘   └──────────────────────────────────┘
                                                    │
                                                    ▼
                                   ┌──────────────────────────────────┐
                                   │ Transferring the Image from the  │
                                   │ Transfer Medium Onto a Textile   │— 110
                                   │ Substrate                        │
                                   └──────────────────────────────────┘
```

DYE SUBLIMATION INK THERMAL INKJET PRINTING METHOD

BACKGROUND

Textile printing methods often include rotary and/or flat-screen printing. Traditional analog printing typically involves the creation of a plate or a screen, i.e., an actual physical image from which ink is transferred to the textile. Both rotary and flat screen printing have great volume throughput capacity, but also have limitations on the maximum image size that can be printed. For large images, pattern repeats are used. Conversely, digital inkjet printing enables greater flexibility in the printing process, where images of any desirable size can be printed immediately from an electronic image without pattern repeats. Inkjet printers, and in particular piezoelectric inkjet printers, are gaining rapid acceptance for digital textile printing. Inkjet printing is a non-impact printing method that utilizes electronic signals to control and direct droplets or a stream of ink to be deposited on media.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The development of man-made hydrophobic fibers (e.g., polyester) for mass production of textiles was problematic for regular dying operations since most of the dyes available at the time did not have a chemical affinity for the textiles. Disperse dyes (used in dye sublimation inks) were useful for dying man-made hydrophobic fibers. Disperse dyes are a class of dyes that exhibit low or no solubility in water. As such, disperse dyes use/include some form of dispersant (e.g., naphthalene sulfonic acid-formalin condensate, ligno-sulfonic acid-formalin condensate, surfactants, etc.) to remain in a fluid form such as an inkjet ink.

Thermal inkjet printing involves electrically activating a resistor, which causes the resistor to heat rapidly and vaporize a thin film of the ink adjacent to the resistor, thereby ejecting a drop of ink from the printhead. The thermal interaction between the resistor and the ink can limit the type of ink that can be printed via thermal inkjet printheads. This type of thermal interaction is not involved in piezoelectric inkjet printing, and this may be one reason that dye sublimation inks have generally been formulated for piezoelectric printing.

However, examples of a method disclosed herein of firing a dye sublimation ink in a thermal inkjet printhead have been unexpectedly and fortuitously found to enable much longer printhead life while successfully printing the dye sublimation ink via a thermal inkjet printhead.

A thermal inkjet printhead uses a certain minimum energy to fire ink drops of the proper volume (called "turn-on energy" (TOE)). Turn-on energy may be different for different printhead designs, and also may vary among different samples of a given printhead design, e.g., as a result of manufacturing tolerances and the like. These tolerances add to an uncertainty in knowing how much energy is being delivered to any given printhead. Therefore, more energy is typically delivered to the average thermal inkjet printhead than is required to fire it (called "over-energy" (OE)) in order to allow for this uncertainty. As a result, thermal inkjet printers are configured to provide a fixed operating/ink firing energy that includes a margin over (the over-energy/OE) the turn-on energy. The fixed operating energy is greater (in that it includes the OE margin) than the expected lowest turn-on energy for the printheads that the printer can accommodate.

Prior attempts to print dye sublimation inks with a thermal inkjet printhead at a typical over-energy range between 30% and 50% generally resulted in thermally induced failure modes. Some examples of such failure modes include resistor damage due, e.g., to drive bubble cavitation, build-up of material on the resistor (kogation) due, e.g., to the breakdown of ink components after repeated firing of the resistor, and build-up of ink materials inside the firing chamber. Some commercially available dye sublimation inks were tested in a thermal inkjet printhead, and about 10-15 mL of ink was able to be printed (well under one million drops per nozzle) before thermally induced failure of the printhead.

However, examples of methods of the present disclosure have been found to enable successful printing of dye sublimation inks by lowering the operating energy (i.e., the operating energy includes a lower over-energy margin than in typical thermal inkjet printing) applied to the heating/firing resistor of the thermal inkjet printhead. The use of relatively low over-energy firing parameters has been found to provide superior printhead life, while enabling acceptable dye sublimation ink drop velocity and drop weight. These results are reproducible across different pens and printheads. This successful thermal inkjet printing of dye sublimation inks is surprising, at least because it may have been expected that the firing energy with the lower over-energy margins may have been too low to consistently fire at acceptable drop velocities/drop weights.

Figure 1:
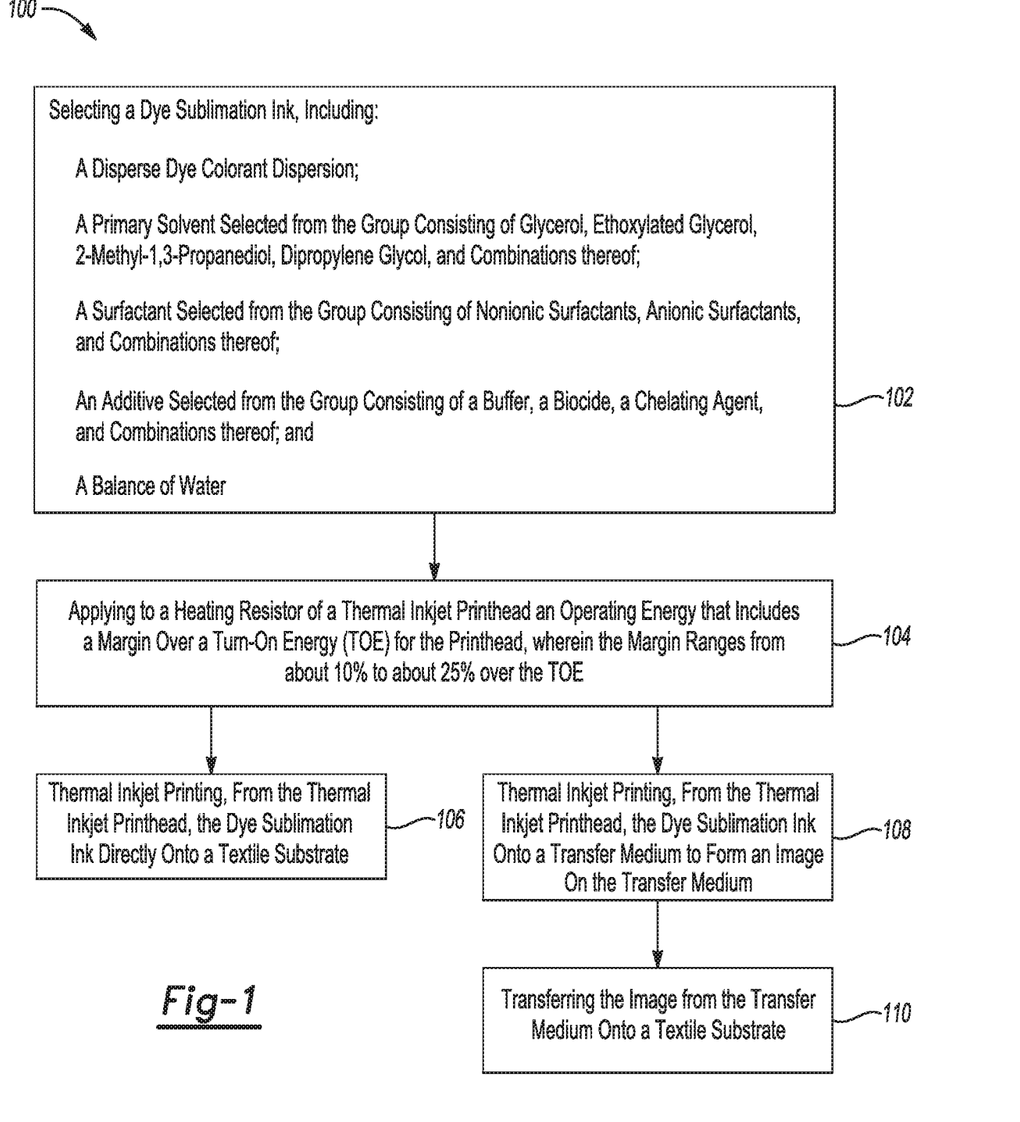
FIG. 1 is a flow diagram illustrating two examples of a printing method.

Referring now to FIG. 1, examples of the dye sublimation ink disclosed herein may be dispensed from a thermal inkjet printhead during examples of the printing method 100. One example of the method 100 (for direct printing) is shown at reference numerals 102, 104 and 106. Another example of the method 100 (for transfer printing) is shown at reference numerals 102, 104, 108, and 110.

An example of a printing method 100 of the present disclosure includes selecting a dye sublimation ink, including: a disperse dye colorant dispersion; a primary solvent selected from the group consisting of glycerol, ethoxylated glycerol, 2-methyl-1,3-propanediol, dipropylene glycol, and combinations thereof; a surfactant selected from the group consisting of nonionic surfactants, anionic surfactants, and combinations thereof; an additive selected from the group consisting of a buffer, a biocide, a chelating agent, and combinations thereof; and a balance of water (as shown at reference numeral 102). The method 100 further includes applying to a heating resistor of a thermal inkjet printhead an operating energy that includes a margin over a turn-on energy (TOE) for the printhead, wherein the margin ranges from about 10% to about 25% over the TOE (as shown at reference numeral 104); and thermal inkjet printing, from the thermal inkjet printhead, the dye sublimation ink: i) directly onto a textile substrate (as shown at reference numeral 106); or ii) onto a transfer medium to form an image on the transfer medium (as shown at reference numeral 108), and transferring the image from the transfer medium onto the textile substrate (as shown at reference numeral 110).

In another example of a printing method of the present disclosure, a dye sublimation ink is selected. The dye sublimation ink includes: a disperse dye colorant dispersion; a primary solvent selected from the group consisting of glycerol, ethoxylated glycerol, 2-methyl-1,3-propanediol, dipropylene glycol, and combinations thereof, wherein the primary solvent is present in an amount ranging from about 10 wt % to about 22 wt % based on a total weight of the ink; a secondary solvent present in an amount ranging from 0 wt % to about 7 wt % based on the total weight of the ink; a surfactant selected from the group consisting of nonionic surfactants, anionic surfactants, and combinations thereof; an additive selected from the group consisting of a buffer, a biocide, a chelating agent, and combinations thereof; and a balance of water. The example method further includes applying to a heating resistor of a thermal inkjet printhead an operating energy that includes a margin over a turn-on energy (TOE) for the printhead, wherein the margin ranges from about 10% to about 20% over the TOE; and thermal inkjet printing, from the thermal inkjet printhead, the dye sublimation ink: i) directly onto a textile substrate; or ii) onto a transfer medium to form an image on the transfer medium, and transferring the image from the transfer medium onto the textile substrate.

Figure 2:
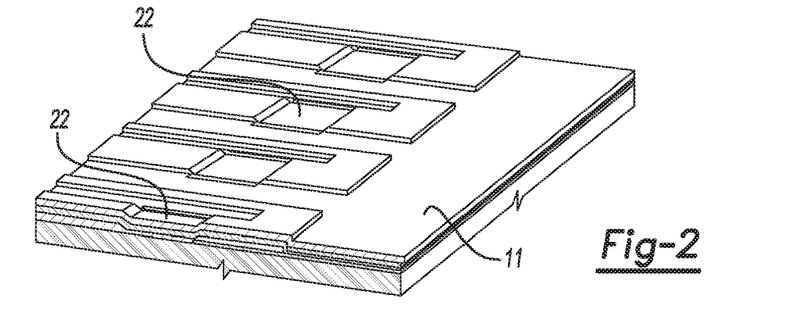
FIG. 2 is a partially cross-sectioned perspective semi-schematic illustration showing an example of heating resistors of an example thermal inkjet printhead.
Figure 3:
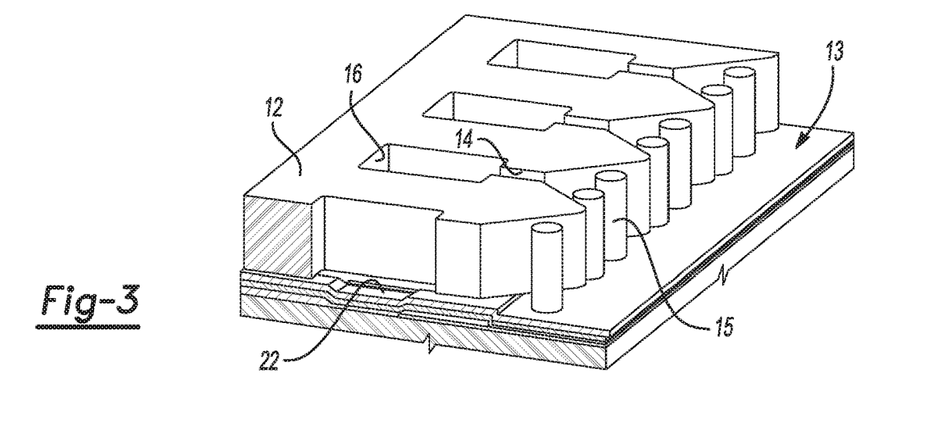
FIG. 3 is a partially cross-sectioned perspective semi-schematic illustration showing an example of ink chambers of an example thermal inkjet printhead.

Referring now to FIGS. 2-5 together, an example thermal inkjet printhead 10 generally includes a base substrate 11 (made, e.g., from silicon or another suitable material). The base substrate 11 may include multiple layers (as shown in FIG. 2) to operatively accommodate suitable electronics to fire printhead nozzles. The printhead 10 further includes a substrate 12 (made, e.g., from a polymeric or other suitable material) defined on the base substrate 11. The substrate 12 has at least one ink feed opening 14 and at least one ink chamber/reservoir 16 defined therein. Four ink feed openings 14 are shown in FIG. 3, though it is to be understood that any desirable number of ink feed openings 14 may be provided. The ink feed opening 14 is in operative and fluid communication with an ink chamber 16 and with an ink channel 13. In an example, one or more pillars 15 may be positioned between the ink channel 13 and the ink feed opening 14 to filter the ink supply before it enters the ink chamber 16.

The ink chamber 16 is generally configured to repeatedly receive ink, via ink feed opening 14 and ink channel 13, from an ink supply or source during inkjet printing. In one example, the printhead 10 may be incorporated with an ink cartridge 26 (see FIG. 5), and the ink chamber 16 receives the ink from one or more ink supply regions housing, e.g., a volume of free ink and/or a capillary media configured to store the ink in individual capillaries. In another example, the printhead 10 may be a separate unit operatively connected (via appropriate tubing or the like) to a remotely located ink supply. In other words, printheads 10 can be integrated into the ink cartridge 26 (Integrated Print Head: IPH); or a printhead 10 can be integrated into a printer which has Individual Ink Cartridges (IIC). It is to be understood that other configurations of the thermal inkjet printhead 10 are also contemplated herein.

Figure 4:
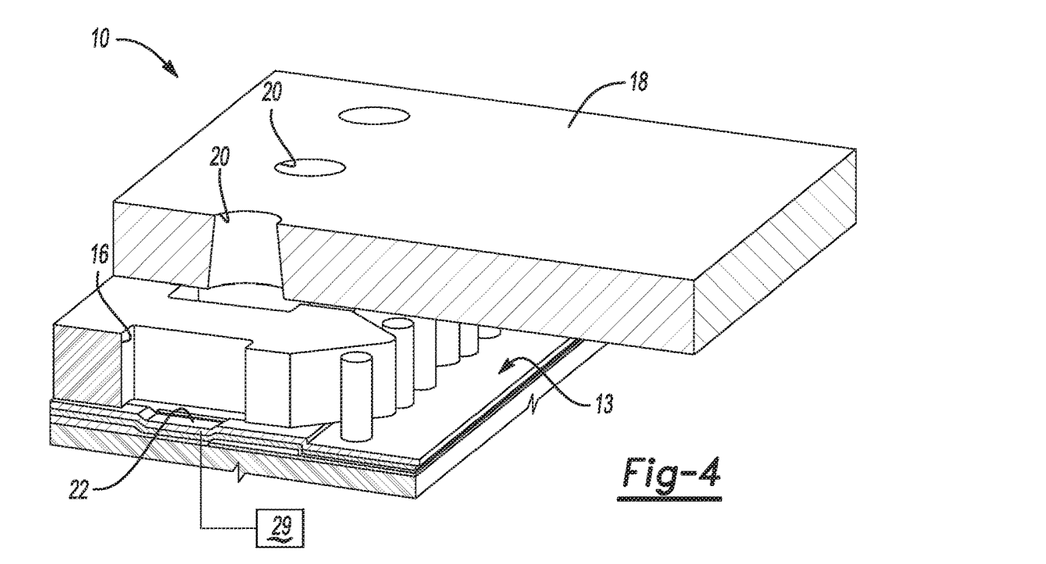
FIG. 4 is a partially cross-sectioned perspective semi-schematic illustration showing an example of a nozzle plate of an example thermal inkjet printhead.

The printhead 10 further includes a nozzle plate 18 disposed on the substrate 12. In an example, the nozzle plate 18 includes a plurality of orifices 20 (three of which are shown in FIG. 4). The orifice 20 is generally in fluid communication with the ink chamber 16 and is configured to eject an ink drop therethrough during an ink ejection process (i.e., the pushing of the ink out of the printhead 10 through the orifice 20 during thermal inkjet printing).

A heating/firing resistor 22 is operatively disposed on the base substrate 11 and proximate to the ink feed opening(s) 14 and ink chamber(s) 16. The heating/firing resistor 22 is also operatively associated with the orifice 20. Although FIG. 4 depicts that the heating/firing resistor 22 is operatively associated with a single orifice 20, it is to be understood that the resistor 22 may also be operatively associated with a plurality of orifices 20.

In an example of a thermal inkjet printhead 10, an array of ink chambers 16 receives liquid ink from the ink channel 13. The heating/firing resistor 22 is located opposite the nozzle/orifice 20 so that ink can collect between it and the orifice 20. The firing of ink droplets is typically under the control of a microprocessor (not shown), the signals of which are conveyed by electrical traces to the resistors 22. When electric printing pulses/electrical current is passed through the inkjet firing/heating resistor 22 to heat it to the desired firing temperature, a small portion of the ink next to it vaporizes and ejects a drop of ink from the printhead 10.

Figure 5:
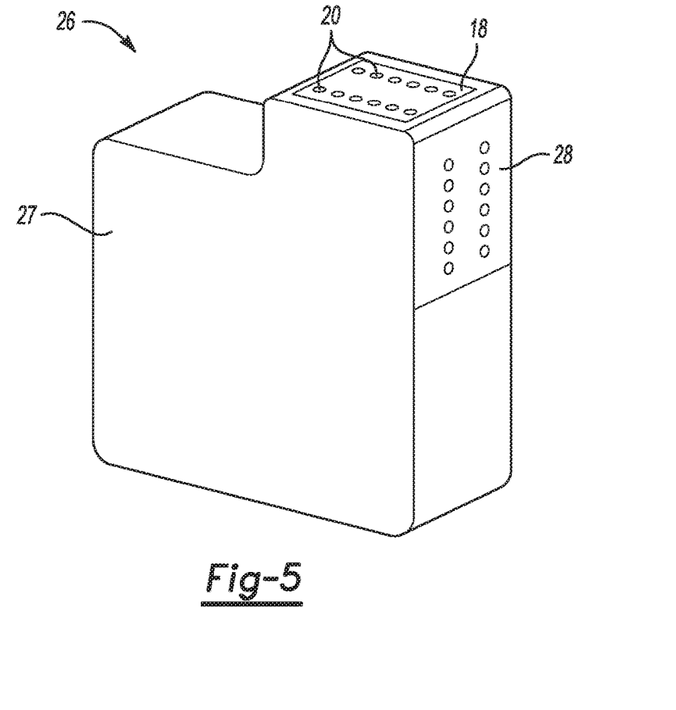
FIG. 5 is a perspective view of an example of a thermal inkjet cartridge.

FIG. 5 is a semi-schematic illustration of an inkjet print cartridge 26 incorporating a printhead 10 according to an example. The inkjet print cartridge 26 includes an internal ink reservoir (not shown) within the cartridge body 27 and a printhead. The body 27 can include the ink reservoir wholly contained within the cartridge body 27 or, alternatively, can include a chamber inside the cartridge body 27 that is fluidly coupled to one or more off-axis ink reservoirs (not shown).

The printhead includes a nozzle plate 18 including orifices 20 formed in a flexible polymer circuit. The flexible circuit provides for the routing of conductive traces which are connected at one end to electrodes on the substrate and on the other end to contact pads 28. The print cartridge 26 is designed to be installed in a printer so that the contact pads 28 on the front surface of the flexible circuit contact printer electrodes, thereby providing externally generated energization signals to the printhead. Each resistor 22 may act as an ohmic heater when selectively energized by one or more pulses applied sequentially or simultaneously to one or more of the contact pads 28.

A printhead controller 29 is operatively connected to the heating resistor 22, to activate an electrical current to pass the electrical current through the heating resistor 22 to apply an operating energy that includes a margin over a turn-on energy (TOE) for the printhead 10, wherein the margin ranges from about 10% to about 25% over the TOE.

It is to be understood that a single printhead 10 may include multiple (e.g., 400 or some other desirable number) heating/firing resistors 22 and orifices 20. While not shown, it is to be understood that the printhead 10 includes an integrated circuit that selectively routes signals (e.g., from a microprocessor (operatively associated with the printhead controller 29) that is capable of running suitable computer readable instructions) to the desirable resistor(s) 22 and orifice(s) 20 for firing ink drops therefrom to produce images directly on the textile substrate or on a transfer medium.

The print cartridge 26 including the heating/firing resistor 22 may be mounted in a carriage of an inkjet printer (not shown). The carriage may move the print cartridge 26 across a print substrate (e.g., the textile substrate or the transfer medium) in a print/image zone of the printer. The orifice(s) 20 associated with the resistor 22 may be arranged in one or more linear orifice arrays. The orifice(s) 20 may be aligned parallel to the direction in which the print substrate is moved through the printer and perpendicular to the direction of motion of the resistor 22 with the print cartridge 26. Control of the ejection of thermal inkjet dye sublimation ink from each orifice 20 causes characters, or other images, to be printed in a swath across the textile substrate or the transfer medium.

Alternatively, the print cartridge 26 may be a page-wide print cartridge that is in fluid communication with an off-axis ink supply system. The page-wide print cartridge includes a print head bar that extends the entire print/image zone, and thus the page-wide print cartridge is static during a printing operation.

An example of a thermal inkjet printing system according to the present disclosure includes a thermal inkjet printhead 10, including a base substrate 11. Another substrate 12 is defined on the base substrate 11, the other substrate 12 having defined therein at least one ink feed opening 14 and at least one ink chamber 16, wherein the at least one ink feed opening 14 is in operative and fluid communication with the at least one ink chamber 16 and with an ink channel 13 to supply ink thereto. A nozzle plate 18 is disposed on a portion of the other substrate 12, the nozzle plate 18 having at least one orifice 20 defined therein, the at least one orifice 20 being in fluid communication with the at least one ink chamber 16. A heating resistor 22 is operatively disposed on the base substrate 11 and is proximate to, and operatively associated with the at least one ink chamber 16 and the at least one orifice 20. The ink chamber 16 contains a dye sublimation ink. The dye sublimation ink includes: a disperse dye colorant dispersion; a primary solvent selected from the group consisting of glycerol, ethoxylated glycerol, 2-methyl-1,3-propanediol, dipropylene glycol, and combinations thereof; a surfactant selected from the group consisting of nonionic surfactants, anionic surfactants, and combinations thereof; an additive selected from the group consisting of a buffer, a biocide, a chelating agent, and combinations thereof; and a balance of water. A printhead controller 29 is operatively connected to the heating resistor 22, to activate an electrical current to pass the electrical current through the heating resistor 22 to apply an operating energy that includes a margin over a turn-on energy (TOE) for the printhead, wherein the margin ranges from about 10% to about 25% over the TOE.

In another example of the thermal inkjet printing system, the margin is about 15% over the TOE.

Figure 6:
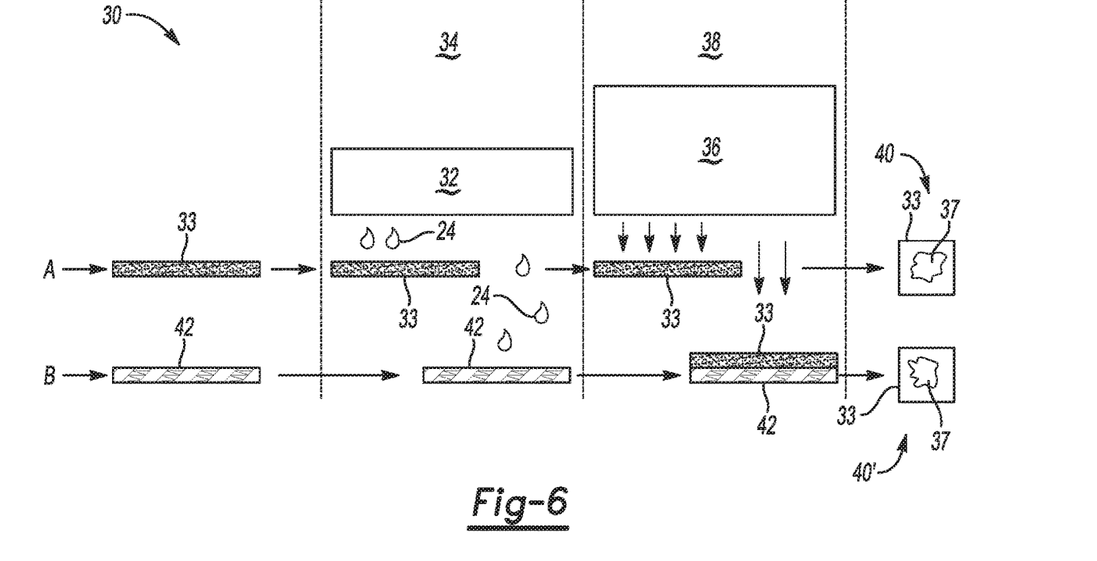
FIG. 6 is a schematic diagram of two examples of a printing system.

Referring now to FIG. 6, a schematic diagram of a printing system 30 including a thermal inkjet printer 32 in a printing zone 34 of the printing system 30 and a dryer 36 positioned in a sublimation zone 38 of the printing system 30.

In one example, a textile substrate 33 may be transported through the printing system 30 along the path shown by arrow A such that the textile substrate 33 is first fed to the printing zone 34 where an example of the thermal inkjet dye sublimation ink 24 disclosed herein is inkjet printed directly onto the textile substrate 33 by the thermal inkjet printer 32 (for example from the printhead 10 as described above) to form an ink layer on the textile substrate 33. The ink layer disposed on the textile substrate 33 may be heated in the printing zone 34 (for example, the air temperature in the printing zone 34 may range from about 10° C. to about 90° C.) such that water may be at least partially evaporated from the ink layer. As an example, at least partial evaporation means that at least 50% of the water is removed. As another example, at least 80% of the water may be removed during evaporation. Generally, it is desirable for enough water to be removed from an area so that color in the area is not transferred to an adjacent portion/facing surface of the textile substrate during/after rolling that comes in contact with the area. The textile substrate 33 (having the ink layer printed thereon) may then be transported to the sublimation zone 38 where the ink layer is heated or heated and exposed to pressure to sublimate the dye, causing it to penetrate into the textile substrate 33. This forms the printed article 40 including the image 37 formed on the textile substrate 33.

In another example, a transfer medium 42 may be transported through the printing system 30 along the path shown by arrow B such that the transfer medium 42 is first fed to the printing zone 34 where an example of the thermal inkjet dye sublimation ink 24 disclosed herein is inkjet printed directly onto the transfer medium 42 by the thermal inkjet printer 32 (for example from the printhead 10 as described above) to form an ink layer on the transfer medium 42. The transfer medium 42 (having the ink layer printed thereon) may then be transported to the sublimation zone 38 and placed into contact with the textile substrate 33. In the sublimation zone 38, the ink layer is heated, or heated and exposed to pressure, to sublimate the dye from the transfer medium 42, causing it to penetrate into the penetrable textile substrate 33. This forms the printed article 40' including the image 37 formed on the textile substrate 33.

In an example of the printing method 100, the thermal inkjet printing is performed using a jetting condition selected from the group consisting of: a voltage ranging from about 18 V to about 30 V; a pulse train ranging from about 1.3 µs to about 2.6 µs; the operating energy ranging from about 0.9 µJ to about 1.11 µJ; an ink chamber warming temperature within a range from about 35° C. to about 70°

C.; and combinations thereof. In an example, the ink chamber warming temperature is within a range from about 45° C. to about 65° C.

In another example of the printing method, the thermal inkjet printing is performed using a jetting condition selected from the group consisting of: a voltage ranging from about 18 V to about 30 V; a pulse train ranging from about 1.3 µs to about 2.6 µs; the operating energy ranging from about 0.9 µJ to about 1.06 µJ; an ink chamber warming temperature within a range from about 35° C. to about 70° C.; and combinations thereof. In an example, the ink chamber warming temperature is within a range from about 45° C. to about 65° C.

In an example, the jetting condition voltage may range from about 27 V to about 30 V.

width=20.8 µm), and the warming temperature of the ink chamber 16 set at about 45° C., the operating energy corresponding to TOE plus about 10% over-energy is about 0.96 µJ, the operating energy corresponding to TOE plus about 15% over-energy is about 1.02 µJ, the operating energy corresponding to TOE plus about 20% over-energy is about 1.06 µJ, and the operating energy corresponding to TOE plus about 25% over-energy is about 1.11 µJ.

Further example values (for example black, cyan, magenta and yellow thermal inkjet dye sublimation inks) for TOE and over-energies for an example printhead having a heating resistor 22 with a surface area of about 620 square microns (length=29.8 µm, width=20.8 µm), and the warming temperature of the ink chamber 16 set at about 45° C. are shown in Table 1 below.

TABLE 1

| Color | TOE (µJ) | 15% OE (µJ) | 20% OE (µJ) | 25% OE (µJ) | 15% OE (V) | 20% OE (V) | 25% OE (V) |
|---|---|---|---|---|---|---|---|
| Black | 0.877 | 1.009 | 1.052 | 1.096 | 27.3 | 27.9 | 28.5 |
| Cyan | 0.878 | 1.010 | 1.054 | 1.098 | 27.4 | 28.0 | 28.6 |
| Magenta | 0.896 | 1.030 | 1.075 | 1.120 | 27.5 | 28.1 | 28.7 |
| Yellow | 0.897 | 1.032 | 1.076 | 1.121 | 27.6 | 28.2 | 28.7 |
| AVERAGE | 0.887 | 1.020 | 1.064 | 1.109 | 27.4 | 28.0 | 28.6 |

As used herein, "pulse train" is the total time in microseconds for a precursor-pulse to the heating resistor 22 (used to conduct heat into the ink film immediately in contact with the resistor 22 surface) plus dead time (a period of no energy pulse between the precursor-pulse and a firing-pulse) plus the firing pulse to the heating resistor 22 (the pulse used to create drive bubble nucleation). For example, if the precursor pulse width is 0.25 µs, the dead time is 0.6 µs, and the firing pulse width is 0.6 µs, the pulse train would be 1.45 µs.

As mentioned herein, examples of the printing method 100 include applying an operating energy to the heating resistor 22 of the thermal inkjet printhead 10 that includes a margin over the turn-on energy (TOE) for the printhead 10. In other words, the operating energy includes an amount of energy corresponding to the TOE plus an amount of energy (the margin) corresponding to the over-energy (OE). In an example, the margin ranges from about 10% to about 25% over the TOE. In another example, the margin ranges from about 10% to about 20% over the TOE. In a further example, the margin is about 15% over the TOE.

It is to be understood that the operating energy is dependent upon various factors, e.g., the size of the resistor 22, manufacturing tolerances, accuracy of electrical components in the printer, variation among print components, resistance of cables, etc. It is also to be understood that the warming temperature at which the ink chamber is set is an adjustable parameter and has some influence on the TOE.

In an example, the operating energy can be determined by first finding the turn-on energy (TOE) of the printhead 10. At the time of manufacture, one example of determining the turn-on energy involves applying a high amount of energy and observing a drop ejection. The energy is then gradually reduced until drop ejection ceases. The turn-on energy point is that energy just above the point where drop ejection ceases. This turn-on energy together with the over-energy margin may then be used to find the operating voltage, and this voltage is written to the printhead assembly memory device.

In an example printhead having a heating resistor 22 with a surface area of about 620 square microns (length=29.8 µm, It is to be understood that these examples of operating energy are illustrative, since the TOE can vary from printer to printer and from printhead to printhead.

An example of the thermal inkjet dye sublimation ink disclosed herein includes a disperse dye colorant dispersion; a primary solvent selected from the group consisting of glycerol, ethoxylated glycerol, 2-methyl-1,3-propanediol, dipropylene glycol, and combinations thereof; a surfactant selected from the group consisting of nonionic surfactants, anionic surfactants, and combinations thereof; an additive selected from the group consisting of a buffer, a biocide, a chelating agent, and combinations thereof; and a balance of water. In some examples, the thermal inkjet dye sublimation ink consists of the listed components and no additional components (such as shear thinning agents, additional solvents, etc.). In other examples, the thermal inkjet dye sublimation ink comprises the listed components, and other components that do not deleteriously affect the jettability of the ink via a thermal inkjet printhead may be added.

Throughout this disclosure, a weight percentage that is referred to as "wt % actives" refers to the loading of an active component of a dispersion or other formulation that is present in the thermal inkjet dye sublimation ink. For example, the wt % actives of the disperse dye colorant dispersion accounts for the loading (as a weight percent) of the active dye solids present in the ink, and does not account for the weight of the other components (e.g., co-solvent, water, etc.) of the disperse dye colorant dispersion in the inkjet ink. The term "wt %," without the term actives, refers to the loading of a 100% active component that does not include other non-active components therein.

In the examples disclosed herein, the disperse dye colorant dispersion may be any color. In an example, the disperse dye colorant dispersion is selected from the group consisting of a black disperse dye colorant dispersion, a cyan disperse dye colorant dispersion, a magenta disperse dye colorant dispersion, and a yellow disperse dye colorant dispersion. Each disperse dye colorant dispersion includes a disperse dye, a dispersant, and a dispersion vehicle.

The disperse dye included in the colorant dispersion may depend on the desired color for the thermal inkjet dye sublimation ink.

Black disperse dye colorant dispersions often include a blend of disperse dyes, such as, for example, blends of blue, brown and yellow disperse dyes, or blends of blue, orange and violet disperse dyes, or blends of blue, orange and yellow disperse dyes, or blue, magenta, and yellow dyes. An example of a suitable blue, brown and yellow disperse dye blend include disperse blue 360 (DB360), disperse brown 27, and disperse yellow 54 (DY54). Some examples of suitable blue, orange and violet disperse dye blends include disperse blue 291:1 (DB291:1), disperse orange 29 (D029) and disperse violet 63, or DB291:1, D029 and disperse violet 99. An example of a suitable blue, orange and yellow dye blend includes DB360, disperse orange 25, and DY54. An example of a suitable blue, magenta, and yellow dye blend includes disperse blue 77 (DB77), disperse red 92, and disperse yellow 114 (DY 114).

Cyan disperse dye colorant dispersions may include blue disperse dyes, such as disperse blue 27, disperse blue 60, disperse blue 73, DB77, disperse blue 87, disperse blue 257, DB291:1, disperse blue 359, DB360, disperse blue 367, and mixtures thereof.

Magenta disperse dye colorant dispersions may include red disperse dyes, such as disperse red 60, disperse red 82, disperse red 86, disperse red 86:1, disperse red 167:1, disperse red 279, and mixtures thereof.

Yellow disperse dye colorant dispersions may include yellow disperse dyes, such as DY54, disperse yellow 64, disperse yellow 71, disperse yellow 86, DY114, disperse yellow 153, disperse yellow 233, disperse yellow 245, and mixtures thereof.

The disperse dye colorant dispersion may include from about 10 wt % dye solids to about 20 wt % dye solids based on the total weight of the colorant dispersion.

As mentioned above, each disperse dye colorant dispersion also includes a dispersant. The dispersant may be any suitable polymeric dispersant that can disperse the dye and that can be jetted via a thermal inkjet printhead.

Some examples of the polymeric dispersant (which may also be anionic or non-ionic) include polymers or copolymers of acrylics, methacrylics, acrylates, methacrylates, styrene, substituted styrene, α-methylstyrene, substituted α-methyl styrenes, vinyl naphthalenes, vinyl pyrollidones, maleic anhydride, vinyl ethers, vinyl alcohols, vinyl alkyls, vinyl esters, vinyl ester/ethylene copolymers, acrylamides, and/or methacrylamides. Some specific examples include a styrene methacrylic acid copolymer, a styrene acrylic acid copolymer, styrene acrylic acid-acrylic ester copolymers, styrene methacrylic acid-acrylic ester copolymers, a styrene maleic anhydride copolymer, polyacrylic acid partial alkyl ester, polyalkylene polyamine, polyacrylates, and vinyl naphthalene-maleic acid copolymers. Another example of a suitable polymeric dispersant is a polyurethane polymer. Still other examples of suitable polymeric dispersants for the disperse dye colorant dispersion include block acrylic copolymers, including A-B block copolymers such as benzyl methacrylate-methacrylic acid diblock copolymers and butyl methacrylate-methacrylic acid diblock copolymers. Still further examples of suitable polymeric dispersants include ABC triblock copolymers, such as benzyl methacrylate-methacrylic acid-ethoxytriethyleneglycol methacrylate triblock copolymers and butyl methacrylate-methacrylic acid-ethoxytriethyleneglycol methacrylate triblock copolymers. Still some other examples of suitable dispersants include low acid value acrylic resins, such as JONCRYL® 586, 671, 675, 678, 680, 683, 690, 693, and 695 (from BASF Corp.).

Examples of polymerization methods used to form the dispersant may include free radical processes, Group Transfer Processes (GTP), radical addition fragmentation (RAFT), atom transfer reaction (ATR), special chain transfer polymerization technology (SCT), and the like. As one example, the dispersant may be a graft acrylic copolymer made by SCT.

In other examples, the disperse dyes may be self-dispersing dyes. The disperse dyes may be exposed to a diazonium treatment (where a charged free radical from a degraded azo attaches to the colorant), or to an ozone treatment (oxidation and functionalization with, e.g., a carboxylic acid), or to a crosslinking treatment to render the dye self-dispersing.

The disperse dye colorant dispersion may include from about 4 wt % dispersant solids to about 7 wt % dispersant solids, based on the total weight of the colorant dispersion.

The mean particle size of the solids (e.g., the disperse dyes and the dispersants) in the disperse dye colorant dispersion may range from about 50 nm to about 200 nm. In another example, the mean particle size of the disperse dye ranges from about 100 nm to about 200 nm. These particle sizes are particularly suitable for being jetted through the orifices of thermal inkjet printheads.

The dispersion vehicle may include water and a water soluble or water miscible co-solvent. Examples of the water soluble or water miscible co-solvent in the disperse dye colorant dispersion may include alcohols (e.g., diols, such as 1,2-propanediol, 1,3-propanediol, etc.), ketones, ketoalcohols, ethers (e.g., the cyclic ether tetrahydrofuran (THF), and others, such as thiodiglycol, sulfolane, 2-pyrrolidone, 1-(2-hydroxyethyl-2-pyrrolidone, 1,3-dimethyl-2-imidazolidinone and caprolactam; glycols such as ethylene glycol, diethylene glycol, tritriethylene glycol, tetraethylene glycol, propylene glycol, dipropylene glycol, tripropylene glycol, trimethylene glycol, butylene glycol, and hexylene glycol; addition polymers of oxyethylene or oxypropylene such as polyethylene glycol, polypropylene glycol and the like; triols such as glycerol and 1,2,6-hexanetriol; lower alkyl ethers of polyhydric alcohols, such as ethylene glycol monomethyl ether, ethylene glycol monoethyl ether, diethylene glycol monomethyl, and diethylene glycol monoethyl ether; and lower dialkyl ethers of polyhydric alcohols, such as diethylene glycol dimethyl or diethyl ether.

One or more of these co-solvents may be present in the disperse dye colorant dispersion in respective amounts ranging from about 1 wt % to about 5 wt %, based on the total weight of the colorant dispersion. The balance of the disperse dye colorant dispersion is water, such as purified water or deionized water.

In an example, the disperse dye colorant dispersion has i) a mean particle size ranging from about 50 nm to about 200 nm, and ii) from about 10 wt % dye solids to about 20 wt % dye solids and from about 4 wt % to about 7 wt % dispersant solids, based on the total weight of the colorant dispersion. In this example, the remainder of the disperse dye colorant dispersion may be co-solvent(s) and water.

To form the thermal inkjet dye sublimation ink disclosed herein, the disperse dye colorant dispersion is incorporated into an ink vehicle, which includes the primary solvent, the surfactant, the additive(s), and water.

The disperse dye colorant dispersion may be incorporated into the ink vehicle such that from about 1 wt % actives to about 7 wt % actives are present, based on a total weight of the thermal inkjet dye sublimation ink. In another example, the disperse dye colorant dispersion may be present in an amount ranging from about 3 wt % actives to about 5 wt % actives based on the total weight of the thermal inkjet dye sublimation ink. The wt % actives of the disperse dye colorant dispersion accounts for the loading (as a weight percent) of the active dye solids present in the ink, and does not account for the weight of the other components (e.g., co-solvent, water, etc.) of the disperse dye colorant dispersion in the inkjet ink.

The primary solvent is selected, in part, because the disperse dye is highly non-soluble in the primary solvent. The primary solvent is also selected, in part, because it also helps to maintain the nozzle health of the thermal inkjet printheads, and to provide substantially consistent print quality over the life of the printhead. In an example, the primary solvent is selected from the group consisting of glycerol, ethoxylated glycerol, 2-methyl-1,3-propanediol, dipropylene glycol, and combinations thereof. The primary solvent is present in an amount ranging from about 10 wt % to about 22 wt % based on the total weight of the ink. It is to be understood that whether a single primary solvent is used or a combination of the primary solvents is used, the total amount of primary solvents is within the given range. In one example, the primary solvent includes a combination of glycerol and ethoxylated glycerol. In this example, the glycerol is present in an amount ranging from about 12 wt % to about 16 wt % based on the total weight of the ink, and the ethoxylated glycerol is present in an amount ranging from greater than 0 wt % to about 5 wt % based on the total weight of the ink.

The ink may also include a secondary solvent present in an amount ranging from 0 wt % to about 7 wt % based on the total weight of the ink. In an example, the disperse dye in the disperse dye colorant dispersion is more soluble in the secondary solvent than in the primary solvent, and thus makes up less than 50% of the total solvent content (i.e., primary solvent plus secondary solvent, and not including water) so that the disperse dyes remain dispersed in the ink vehicle. Example of the secondary solvent are selected from the group consisting of 1,2-propanediol, 1,3-propanediol, propylene glycol, 2-pyrrolidone, tetrahydrofuran, diethylene glycol, and combinations thereof. The secondary solvent may be added to the ink vehicle or may be included as part of the disperse dye colorant dispersion. The co-solvent(s) is present in the disperse dye colorant dispersion in relatively low amounts (1 wt % to about 5 wt % based on the total weight of the colorant dispersion), and thus a fraction of the co-solvent(s) is carried over to the ink disclosed herein depending, in part, upon the dispersion solids and the loading of the dispersion in the ink.

In an example, the primary solvent is present in an amount ranging from about 10 wt % to about 22 wt % based on the total weight of the ink, and the dye sublimation ink further includes the secondary solvent present in an amount ranging from 0 wt % to about 7 wt % based on the total weight of the ink, wherein the disperse dye in the disperse dye colorant dispersion is more soluble in the secondary solvent than in the primary solvent.

The ink also includes the surfactant, which may be nonionic, anionic, or combinations thereof. In an example, the total amount of surfactant(s) in the thermal inkjet dye sublimation ink ranges from about 0 wt % to about 2 wt % (with respect to the weight of the thermal inkjet dye sublimation ink). In another example, the surfactant is present in an amount of 1 wt % or less. The surfactant(s) may be included in the thermal inkjet dye sublimation ink to aid in jettability, control the viscosity, to improve the lubricity, and to prevent agglomeration of the dispersed dye solids. Examples of suitable surfactants include oleth-3-phosphate, nonionic, low foaming surfactants, such as ethoxylated 2,4,7,9-tetramethyl 5 decyn-4,7-diol (commercially available as SURFYNOL® 465 (HLB 13) from Evonik Industries) and other ethoxylated surfactants (commercially available as SURFYNOL® 440 (HLB 8) from Evonik Industries), or secondary alcohol ethoxylates (commercially available as TERGITOL® 15-S-7 (HLB 12.1), TERGITOL® 15-S-9 (HLB 12.6), etc. from The Dow Chemical Co.). In an example, the surfactant is oleth-3-phosphate, ethoxylated 2,4,7,9-tetramethyl 5 decyn-4,7-diol, or combinations thereof. In some examples, it has been found that the combination of SURFYNOL® 465 and SURFYNOL® 440 may contribute to the synergistic effects of the inks disclosed herein in terms of wetting.

When oleth-3-phosphate is included, it may be present in an amount ranging from about 0.1 wt % to about 0.75 wt % based on the total weight of the ink. In an example, the oleth-3-phosphate is present in an amount ranging from about 0.2 wt % to about 0.5 wt % based on the total weight of the ink. Oleth-3-phosphate is commercially available as CRODAFOS™ O3A or CRODAFOS™ N-3 acid from Croda. It is believed that the oleth-3-phosphate may aid the chelating agent (when included) in effectively trapping high levels of metal ions present in the ink (e.g., from the colorant dispersion), and that the chelating agent (when included) keeps the oleth-3-phosphate from precipitating out of the ink. This combination leads to a significant and unexpected reduction in kogation in the thermal inkjet printhead. Kogation refers to the deposit of dried ink on a heating element of a thermal inkjet printhead, and the combination of the oleth-3-phosphate with the chelating agent assists in preventing the buildup of kogation and extending the life of the printhead. These synergistic effects are unexpected given the small amount of the two components and the relatively high level of metal ions (e.g., from about 4 ppm to about 10 ppm) that may be present in the ink (due to the disperse dye colorant dispersion).

As previously mentioned, examples of the ink disclosed herein may also include additive(s), such as the chelating agent, the buffer, the biocide, and combinations thereof.

When included, the chelating agent is present in an amount greater than 0 wt % actives and less than 0.1 wt % actives based on the total weight of the ink. In an example, the chelating agent is present in an amount ranging from about 0.04 wt % actives to about 0.08 wt % actives based on the total weight of the ink. The wt % actives of the chelating agent accounts for the loading (as a weight percent) of the active chelator/chelating agent present in the ink, and does not account for the weight of other components of the chelating agent solution (e.g., water) in the inkjet ink.

In an example, the chelating agent is selected from the group consisting of methylglycinediacetic acid, trisodium salt; 4,5-dihydroxy-1,3-benzenedisulfonic acid disodium salt monohydrate; ethylenediaminetetraacetic acid (EDTA); hexamethylenediamine tetra(methylene phosphonic acid), potassium salt; and combinations thereof. Methylglycinediacetic acid, trisodium salt ($Na_3MGDA$) is commercially available as TRILON® M from BASF Corp. 4,5-dihydroxy-1,3-benzenedisulfonic acid disodium salt monohydrate is commercially available as TIRON™ monohydrate. Hexamethylenediamine tetra(methylene phosphonic acid), potassium salt is commercially available as DEQUEST® 2054 from Italmatch Chemicals.

The surfactant and chelating agent, and their respective amounts, may depend, in part, on the colorant dispersion that is included in the ink. In an example, the chelating agent is present in an amount greater than 0 wt % actives and less than 0.1 wt % actives based on the total weight of the ink; and the surfactant (oleth-3-phosphate) is present in an amount ranging from about 0.1 wt % to about 0.75 wt % based on the total weight of the ink. In this example, the chelating agent is selected from the group consisting of methylglycinediacetic acid, trisodium salt; 4,5-dihydroxy -1,3-benzenedisulfonic acid disodium salt monohydrate; ethylenediaminetetraacetic acid (EDTA); and hexamethyl- enediamine tetra(methylene phosphonic acid), potassium salt. In another example, the ink is a black ink or a magenta ink, the chelating agent is present in an amount greater than 0 wt % actives and less than 0.1 wt % actives based on the total weight of the ink, and the surfactant is a combination of oleth-3-phosphate and ethoxylated 2,4,7,9-tetramethyl 5 decyn-4,7-diol. In still another example, the ink is a cyan ink or a yellow ink, the chelating agent is present in an amount greater than 0 wt % actives and less than 0.1 wt % actives based on the total weight of the ink, and the surfactant is ethoxylated 2,4,7,9-tetramethyl 5 decyn -4,7-diol.

In an example, the pH of the thermal inkjet dye sublima- tion ink ranges from about 7 to about 9.5 at the time of manufacture. In another example, the pH of the thermal inkjet dye sublimation ink ranges from about 8 to about 9 at the time of manufacture. pH adjuster(s), such as a buffer, may be added to the ink to counteract any slight pH drop that may occur over time. The pH may drop from about 0.5 units to about 1 unit over time after being manufactured. As such, the pH of the inks disclosed herein may be lower than the ranges set forth herein, depending, in part, upon how much time has passed since manufacture. In an example, the total amount of buffer(s) in the ink ranges from 0 wt % to about 0.5 wt % (with respect to the weight of the thermal inkjet dye sublimation ink). In another example, the total amount of buffer(s) in the ink is about 0.1 wt % (with respect to the weight of the thermal inkjet dye sublimation ink). Examples of some suitable buffers include TRIS (tris(hydroxymethyl) aminomethane or Trizma), bis-tris propane, TES (2-[(2- Hydroxy -1,1-bis(hydroxymethyl)ethyl)amino]ethanesulfo- nic acid), MES (2-ethanesulfonic acid), MOPS (3-(N- morpholino)propanesulfonic acid), HEPES (4-(2- hydroxyethyl)-1-piperazineethanesulfonic acid), DIPSO (3- (N,N-Bis[2-hydroxyethyl]amino)-2- hydroxypropanesulfonic acid), Tricine (N-[tris (hydroxymethyl)methyl]glycine), HEPPSO (β-Hydroxy-4- (2-hydroxyethyl)-1-piperazinepropanesulfonic acid monohydrate), POPSO (Piperazine-1,4-bis(2-hydroxypro- panesulfonic acid) dihydrate), EPPS (4-(2-Hydroxyethyl)- 1-piperazinepropanesulfonic acid, 4-(2-Hydroxyethyl)pip- erazine-1-propanesulfonic acid), TEA (triethanolamine buffer solution), Gly-Gly (Diglycine), bicine (N,N-Bis(2- hydroxyethyl)glycine), HEPBS (N-(2-Hydroxyethyl)pipera- zine-N'-(4-butanesulfonic acid)), TAPS ([tris(hydroxymeth- yl)methylamino]propanesulfonic acid), AMPD (2-amino-2- methyl-1,3-propanediol), TABS (N-tris(Hydroxymethyl) methyl-4-aminobutanesulfonic acid), or the like.

In an example, the total amount of biocide(s) in the thermal inkjet dye sublimation ink ranges from about 0 wt % actives to about 0.5 wt % actives (with respect to the weight of the thermal inkjet dye sublimation ink). In another example, the total amount of biocide(s) in the inkjet ink composition is about 0.001 wt % actives to about 0.1 wt % actives (with respect to the weight of the thermal inkjet dye sublimation ink). The wt % actives of the biocide accounts for the loading (as a weight percent) of the active biocidal agent present in the ink, and does not account for the weight of other components of the biocide (e.g., water) in the inkjet ink.

Examples of suitable biocides include the NUOSEPT® (Ashland Inc.), UCARCIDE™ or KORDEK™ or ROCIMA™ (Dow Chemical Co.), PROXEL® (Arch Chemicals) series, ACTICIDE® B20 and ACTICIDE® M20 and ACTICIDE® MBL (blends of 2-methyl-4-isothi- azolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4- isothiazolin-3-one (CIT or CMIT) and MIT under the trade- name KATHON™ (Dow Chemical Co.), and combinations thereof.

It is to be understood that water is not considered a solvent or co-solvent in the inks disclosed herein, but rather is present in addition to the primary and secondary co-solvent(s) and makes up a balance of the ink. As such, the weight percentage of the water present in the thermal inkjet dye sublimation inks will depend, in part, upon the weight percentages of the other components. The water may be purified or deionized water.

To further illustrate the present disclosure, examples are given herein. It is to be understood that these examples are provided for illustrative purposes and are not to be construed as limiting the scope of the present disclosure.

EXAMPLES

Example 1

An ink set including example black, cyan, magenta, and yellow dye sublimation inks was prepared. The example ink formulations are shown in Table 2. The weight percentages given for the dye dispersion, the chelating agent and the biocide represent wt % actives in the ink formulations.

TABLE 2

| Ingredient | Specific Component | Black (wt %) | Cyan (wt %) | Magenta (wt %) | Yellow (wt %) |
|---|---|---|---|---|---|
| Dye Dispersion | Black Dispersion | 5 | N/A | N/A | N/A |
| | Cyan Dispersion | N/A | 5 | N/A | N/A |
| | Magenta Dispersion | N/A | N/A | 5 | N/A |
| | Yellow Dispersion | N/A | N/A | N/A | 5 |
| Solvent | Glycerol | 15 | 20 | 15 | 15 |
| | Ethoxylated Glycerol | 5 | N/A | 5 | 5 |
| Surfactant | SURYNOL® 465 | 0.5 | 0.5 | 0.5 | 0.5 |
| Jetting Aid (surfactant) | Oleth-3- Phosphate | 0.2 | N/A | 0.2 | N/A |
| Chelating Agent | TRILON® M | 0.04 | 0.04 | 0.04 | 0.04 |
| Buffer | TRIS | 0.1 | 0.1 | 0.1 | 0.1 |
| Biocide | ACTICIDE B20 | 0.04 | 0.04 | 0.04 | 0.04 |
| | ACTICIDE M20 | 0.02 | 0.02 | 0.02 | 0.02 |
| Water | | Balance | Balance | Balance | Balance |

To evaluate the influence of energy settings on kogation development, pens loaded with the inks were exercised at four different over-energy and power density combinations (see Table 3 below). The printhead heating resistor had a surface area of about 620 square microns (length=29.8 μm, width=20.8 μm), and the warming temperature of the ink chamber was set at 45° C.

TABLE 3

| Test Group | Over Energy [%] | Power Density [W/μm²] | Voltage [V] | Pulse Train [μs] |
|---|---|---|---|---|
| PD-A OE30 | 30 | 0.002 | 29.7 | 0.25 pcp + 0.6 dt + 0.6 fp |
| PD-A OE15 | 15 | 0.002 | 27.9 | 0.25 pcp + 0.6 dt + 0.6 fp |
| PD-B OE30 | 30 | 0.001 | 19.8 | 0.57 pcp + 0.6 dt + 1.4 fp |
| PD-B OE15 | 15 | 0.001 | 19.8 | 0.5 pcp + 0.6 dt + 1.2 fp | where: pcp = precursor-pulse width (used to conduct heat into the ink film immediately in contact with the resistor surface)
dt = dead time (period of no energy pulse between precursor-pulse and firing-pulse)
fp = firing pulse width (pulse used to create drive bubble nucleation)

Two energy configurations (PD-A OE30 and PD-A OE15) use the same pulse train (0.25 μs precursor-pulse, 0.6 μs dead time, 0.6 μs firing-pulse), but use different voltages for the different over-energies. The other two energy configurations (PD-B OE30 and PD-B OE15) have half of the power density (the rate of energy transfer per unit area) than their PD-A counterparts. The PD-B energy configurations deliver the same overall amount of energy, but over a longer period of time. This reduction in power density is accomplished by elongating the pulse train and using a lower operating voltage. The two PD-B (lower power density) settings use the same operating voltage, but use different pulse lengths for the different over-energies.

The example inks were tested using HP 831 thermal inkjet color printheads and various test fixtures to repeatedly fire the printheads (at the four different over-energy and power density combinations described above in Table 3) and to measure drop velocity (DV, in m/s) and drop weight (DW, in ng) (to evaluate nozzle performance) at various life stages of the printheads, represented by millions of drops per nozzle (MDPN). Each of these values was taken at a given life stage, namely 0, 20, 50, 100, 200, 300 MDPN. Two tests were performed for each of the example inks, where the respective inks were printed from both sides of respective printheads.

Drop velocity was the primary metric used to evaluate kogation. Drop velocity may be more sensitive to a change in the effective energy imparted into the ink due to kogation than drop weight, especially in the early stages of kogation. As kogation develops on the ink/metal interface, thermal energy transfer from the resistor to the ink may be impeded, resulting in the ink receiving a lower effective energy. This alters the nucleation sequence of the drive bubble and may result in a weaker (smaller and less forceful) drive bubble. Since less energy is imparted into the drive bubble, it is less able to do work on the ink, which results in less energy being imparted to the ink as it is ejected. This decreases the velocity (kinetic energy) of the drop. Once the effective energy reaches a low enough level (below the turn-on energy), the volume of the ink drop begins to significantly decrease as well.

Figure 7:
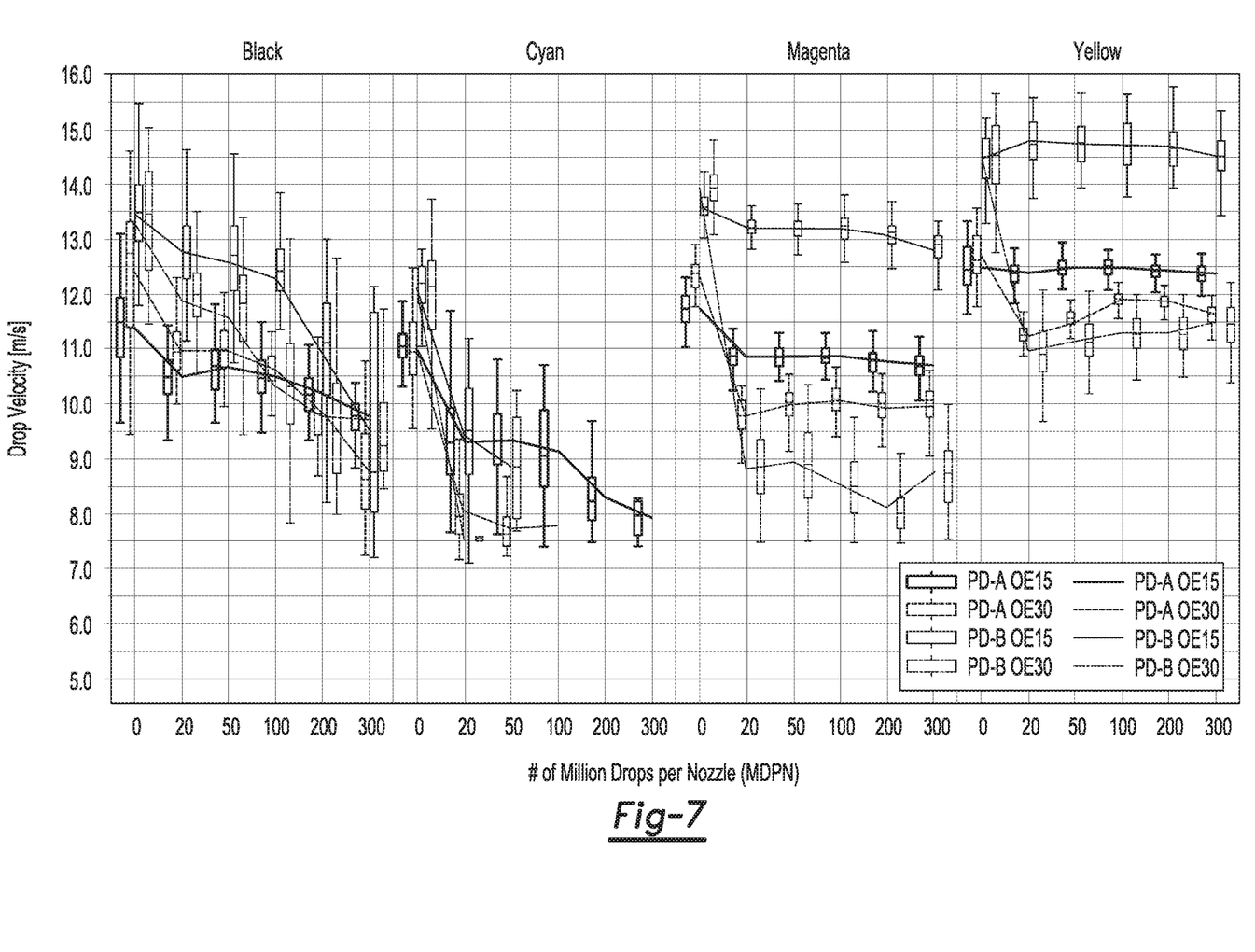
FIG. 7 is a graph depicting the drop velocity in meters per second at varied over-energy and power density values, versus various printhead life stages in terms of millions of drops per nozzle (MDPN) for example black, cyan, magenta and yellow thermal inkjet dye sublimation inks.

FIG. 7 is a graph depicting the drop velocity in meters per second at the four different over-energy and power density combinations, versus various printhead life stages in terms of millions of drops per nozzle (MDPN) (namely 0, 20, 50, 100, 200, 300 MDPN) for the example black, cyan, magenta and yellow thermal inkjet dye sublimation inks.

As can be seen in FIG. 7, over-energy had a larger influence on kogation (as measured by the smallest decrease in drop velocity) than power density. For both "PD-A" and "PD-B" groups, the 15% over-energy setting resulted in a significantly smaller decrease in drop velocity than the 30% over-energy setting.

The 15% over-energy settings had a slower rate of DV decline (and longer life for cyan) than the 30% over-energy settings. The higher power density (PD-A) settings had a slower rate of DV decline and less DV variation than the lower power density (PD-B) settings. The lower power density (PD-B) settings had a higher initial DV than the higher power density (PD-A) settings, and also had a faster DV decline.

The finding that 15% over-energy results in less drop velocity loss than 30% over-energy is consistent with similar kogation tests run later with other examples of the ink set described above. The results from some of the ink tests are shown in FIGS. 8A-10B.

Figure 8A:
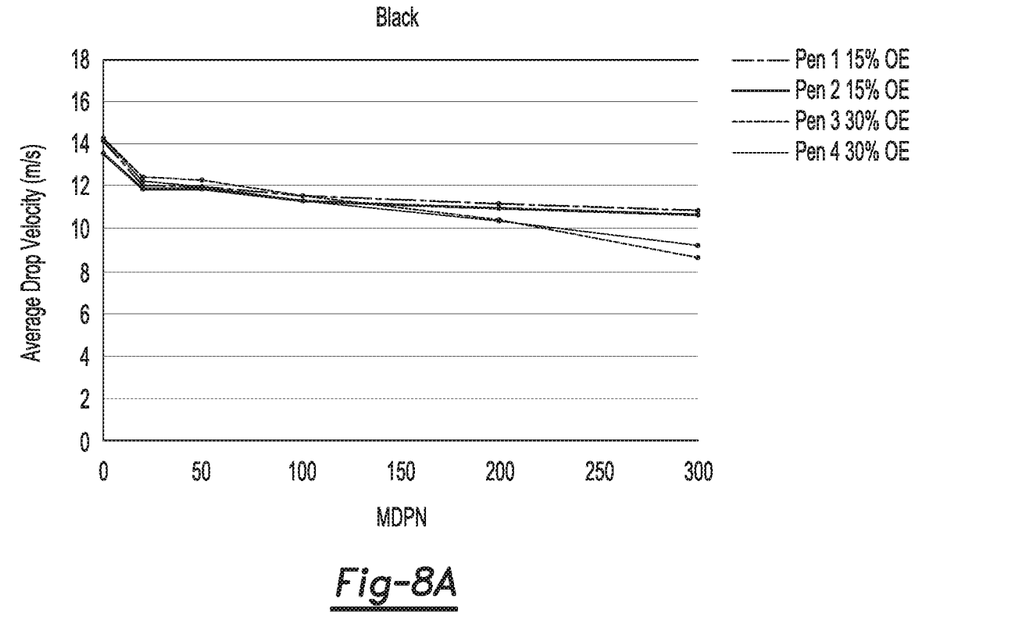
FIGS. 8A and 8B are graphs depicting the average drop velocity in meters per second (FIG. 8A) and the average drop weight in nanograms (FIG. 8B) at two example over-energy values, and at various printhead life stages in terms of millions of drops per nozzle (MDPN) for an example black thermal inkjet dye sublimation ink.
Figure 8B:
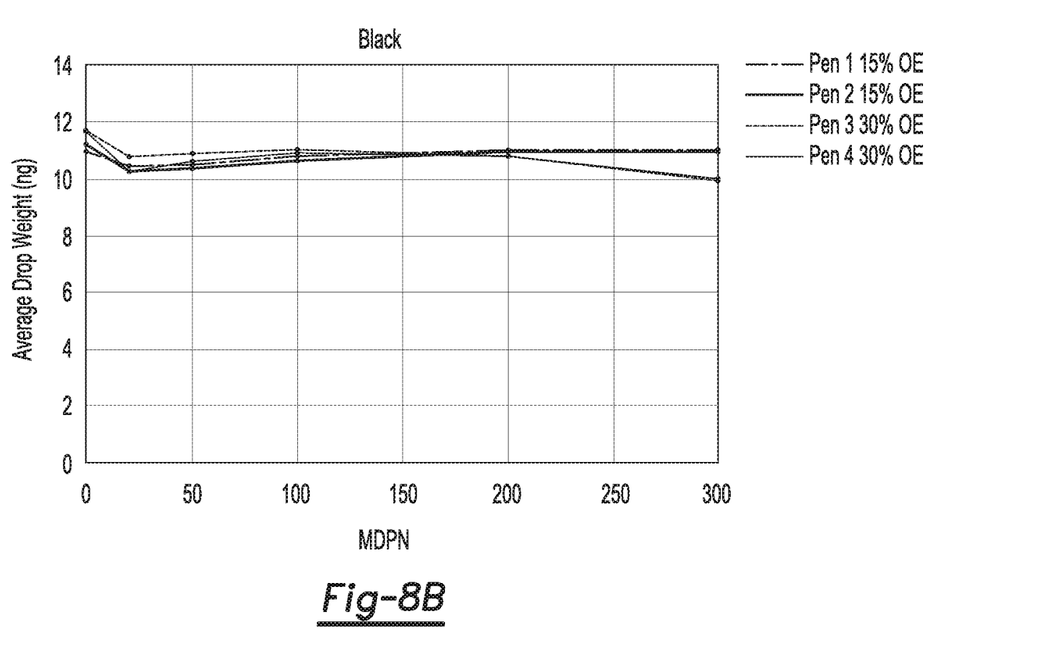

FIGS. 8A and 8B depict the average drop velocity in meters per second (FIG. 8A) and the average drop weight in nanograms (FIG. 8B) at 15% and 30% over-energy values, and at various printhead life stages in terms of millions of drops per nozzle (MDPN) (namely 0, 20, 50, 100, 200, 300 MDPN) for an example black thermal inkjet dye sublimation ink. As can be seen, the pens fired at the 15% over-energy settings (as compared to the pens fired at the 30% over-energy settings) had a slower rate of DV decline and maintained an acceptable drop weight out to long life (i.e., 300 MDPN).

Figure 9A:
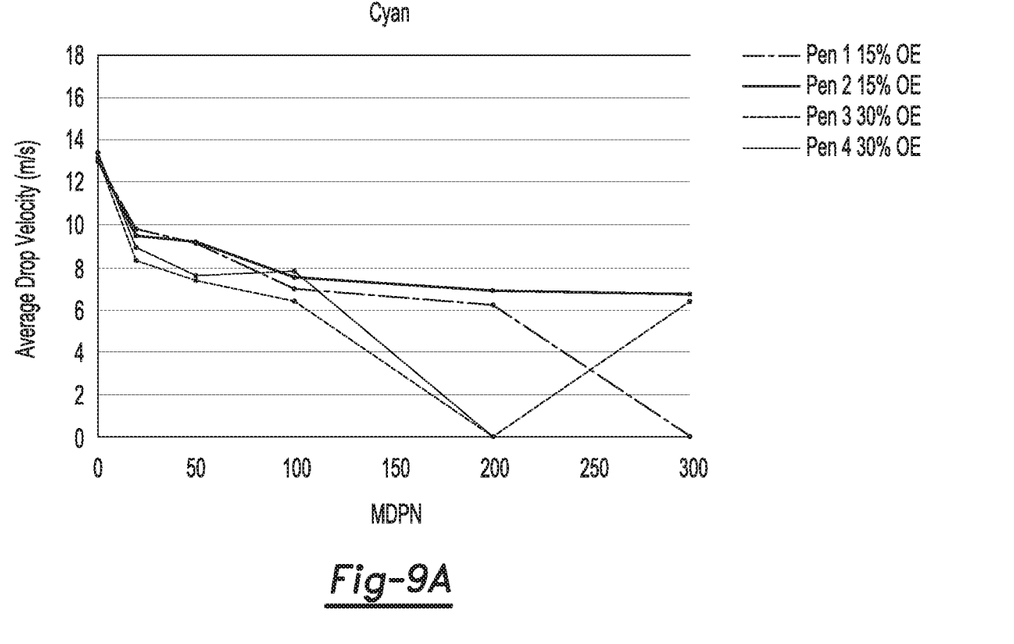
FIGS. 9A and 9B are graphs depicting the average drop velocity in meters per second (FIG. 9A) and the average drop weight in nanograms (FIG. 9B) at two example over-energy values, and at various printhead life stages in terms of millions of drops per nozzle (MDPN) for an example cyan thermal inkjet dye sublimation ink.
Figure 9B:
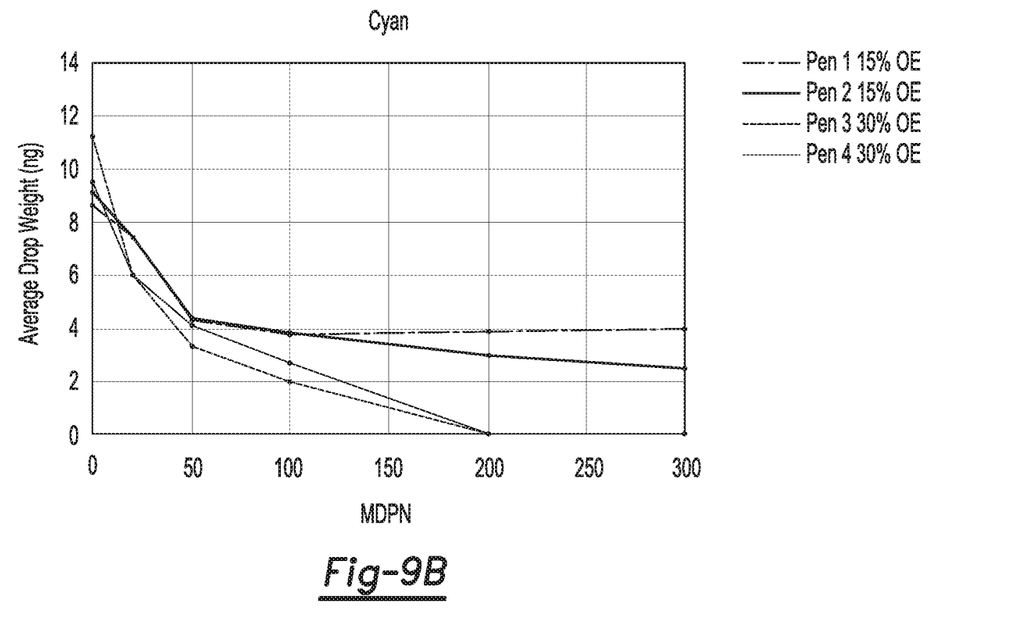

FIGS. 9A and 9B are graphs depicting the average drop velocity in meters per second (FIG. 9A) and the average drop weight in nanograms (FIG. 9B) at 15% and 30% over-energy values, and at various printhead life stages in terms of millions of drops per nozzle (MDPN) (namely 0, 20, 50, 100, 200, 300 MDPN) for an example cyan thermal inkjet dye sublimation ink. As can be seen, the pens fired at the 15% over-energy settings (as compared to the pens fired at the 30% over-energy settings) had a slower rate of DV decline and/or an acceptable DV for a longer life, and had a slower drop weight decline out to long life (i.e., 300 MDPN).

Figure 10A:
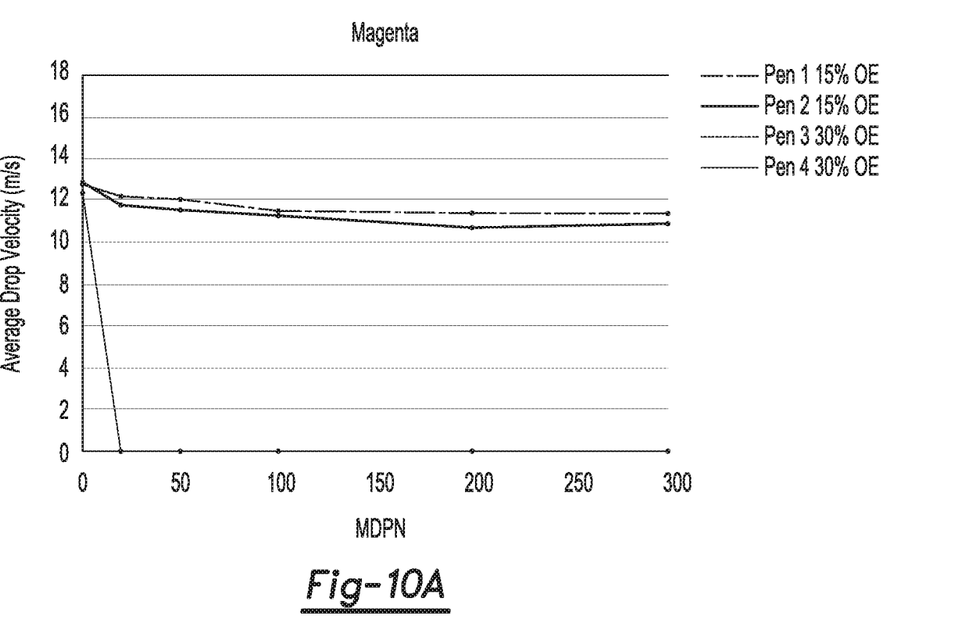
FIGS. 10A and 10B are graphs depicting the average drop velocity in meters per second (FIG. 10A) and the average drop weight in nanograms (FIG. 10B) at two example over-energy values, and at various printhead life stages in terms of millions of drops per nozzle (MDPN) for an example magenta thermal inkjet dye sublimation ink.
Figure 10B:
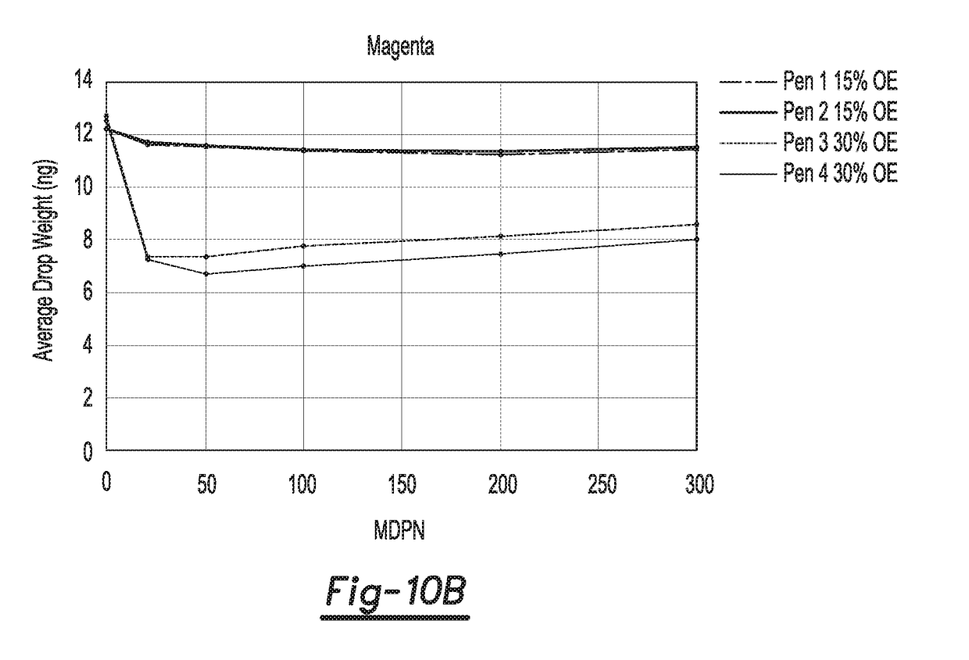

FIGS. 10A and 10B are graphs depicting the average drop velocity in meters per second (FIG. 10A) and the average drop weight in nanograms (FIG. 10B) at 15% and 30% over-energy values, and at various printhead life stages in terms of millions of drops per nozzle (MDPN) (namely 0, 20, 50, 100, 200, 300 MDPN) for an example magenta thermal inkjet dye sublimation ink. As can be seen, the pens fired at the 15% over-energy settings (as compared to the pens fired at the 30% over-energy settings) exhibited a relatively consistent DV out to long life (i.e., 300 MDPN), and maintained an acceptable drop weight out to long life (i.e., 300 MDPN).

As can be seen in each of FIGS. 8A-8B, 9A-9B and 10A-10B, with increasing firing (e.g., past 50 or 100 MDPN) those pens at 15% over-energy appear to maintain drop velocity better than those pens at 30% over-energy.

It is to be understood that the ranges provided herein include the stated range and any value or sub-range within the stated range. For example, a range from about 10 wt % to about 22 wt % should be interpreted to include not only the explicitly recited limits of from about 10 wt % to about 22 wt %, but also to include individual values, such as 13 wt %, 18 wt %, 20.5 wt %, etc., and sub-ranges, such as from about 11 wt % to about 20 wt %, from about 15 wt % to about 18 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A printing method, comprising:
    selecting a dye sublimation ink, including:
        a disperse dye colorant dispersion;
        a primary solvent selected from the group consisting of glycerol, ethoxylated glycerol, 2-methyl-1,3-propanediol, dipropylene glycol, and combinations thereof;
        a surfactant selected from the group consisting of nonionic surfactants, anionic surfactants, and combinations thereof;
        an additive selected from the group consisting of a buffer, a biocide, a chelating agent, and combinations thereof; and
        a balance of water;
    applying to a heating resistor of a thermal inkjet printhead an operating energy that includes a margin over a turn-on energy (TOE) for the printhead, wherein the margin ranges from about 10% to about 25% over the TOE; and
    thermal inkjet printing, from the thermal inkjet printhead, the dye sublimation ink:
        i) directly onto a textile substrate; or
        ii) onto a transfer medium to form an image on the transfer medium; and
        transferring the image from the transfer medium onto the textile substrate.

2. The printing method as defined in claim 1 wherein the thermal inkjet printing is performed using a jetting condition selected from the group consisting of:
    a voltage ranging from about 18 V to about 30 V;
    a pulse train ranging from about 1.3 μs to about 2.6 μs;
    the operating energy ranging from about 0.9 μJ to about 1.1 μJ;
    an ink chamber warming temperature within a range from about 35° C. to about 70° C.; and
    combinations thereof.

3. The printing method as defined in claim 1 wherein the primary solvent is present in an amount ranging from about 10 wt% to about 22 wt% based on a total weight of the ink, and wherein the dye sublimation ink further includes a secondary solvent present in an amount ranging from 0 wt% to about 7 wt% based on the total The weight of the ink, wherein a disperse dye in the disperse dye colorant dispersion is more soluble in the secondary solvent than in the primary solvent.

4. The printing method as defined in claim 3 wherein the disperse dye colorant dispersion is present in an amount ranging from about 1 wt% actives to about 7 wt% actives based on a total weight of the ink.

5. The printing method as defined in claim 4 wherein the dye sublimation ink includes:
    the chelating agent present in an amount greater than 0 wt% actives and less than 0.1 wt% actives based on the total weight of the ink; and
    the surfactant, wherein the surfactant is oleth-3-phosphate present in an amount ranging from about 0.1 wt% to about 0.75 wt% based on the total weight of the ink.

6. The printing method as defined in claim 5 wherein the chelating agent is selected from the group consisting of methylglycinediacetic acid, trisodium salt; 4,5-dihydroxy-1,3-benzenedisulfonic acid disodium salt monohydrate; ethylenediaminetetraacetic acid; hexamethylenediamine tetra (methylene phosphonic acid), potassium salt; and combinations thereof.

7. The printing method as defined in claim 1 wherein the primary solvent includes a combination of glycerol and ethoxylated glycerol.

8. The printing method as defined in claim 7 wherein the glycerol is present in an amount ranging from about 12 wt% to about 16 wt% based on the total weight of the ink, and wherein the ethoxylated glycerol is present in an amount ranging from greater than 0 wt% to about 5 wt% based on the total weight of the ink.

9. The printing method as defined in claim 1 wherein the disperse dye colorant dispersion has i) a mean particle size ranging from about 50 nm to about 200 nm, and ii) from about 10 wt% dye solids to about 20 wt% dye solids and from about 4 wt% to about 7 wt% dispersant solids, based on a total weight of the colorant dispersion.

10. The printing method as defined in claim 1 wherein the disperse dye colorant dispersion is selected from the group consisting of a black disperse dye colorant dispersion, a cyan disperse dye colorant dispersion, a magenta disperse dye colorant dispersion, and a yellow disperse dye colorant dispersion.

11. The printing method as defined in claim 3 wherein the secondary solvent is selected from the group consisting of 1,2-propanediol, 1,3-propanediol, propylene glycol, 2-pyrrolidone, tetrahydrofuran, diethylene glycol, and combinations thereof.

12. A thermal inkjet printing method, comprising:
    selecting a dye sublimation ink, including:
        a disperse dye colorant dispersion;
        a primary solvent selected from the group consisting of glycerol, ethoxylated glycerol, 2-methyl-1,3-propanediol, dipropylene glycol, and combinations thereof, wherein the primary solvent is present in an amount ranging from about 10 wt% to about 22 wt% based on a total weight of the ink;
        a secondary solvent present in an amount ranging from 0 wt% to about 7 wt% based on the total weight of the ink;
        a surfactant selected from the group consisting of nonionic surfactants, anionic surfactants, and combinations thereof;
        an additive selected from the group consisting of a buffer, a biocide, a chelating agent, and combinations thereof; and
        a balance of water;
    applying to a heating resistor of a thermal inkjet printhead an operating energy that includes a margin over a turn-on energy (TOE) for the printhead, wherein the margin ranges from about 10% to about 20% over the TOE; and thermal inkjet printing, from the thermal inkjet printhead, the dye sublimation ink:
i) directly onto a textile substrate; or
ii) onto a transfer medium to form an image on the transfer medium; and
transferring the image from the transfer medium onto the textile substrate.

13. The thermal inkjet printing method as defined in claim 12 wherein the thermal inkjet printing is performed using a jetting condition selected from the group consisting of:
a voltage ranging from about 18 V to about 30 V;
a pulse train ranging from about 1.3 μs to about 2.6 μs;
the operating energy ranging from about 0.9 μJ to about 1.06 μJ;
an ink chamber warming temperature within a range from about 35° C. to about 70° C.; and
combinations thereof.

14. A thermal inkjet printing system, comprising:
a thermal inkjet printhead, including:
a base substrate;
an other substrate defined on the base substrate, the other substrate having defined therein at least one ink feed opening and at least one ink chamber, wherein the at least one ink feed opening is in operative and fluid communication with the at least one ink chamber and with an ink channel to supply ink thereto;
a nozzle plate disposed on a portion of the other substrate, the nozzle plate having at least one orifice defined therein, the at least one orifice being in fluid communication with the at least one ink chamber; and
a heating resistor operatively disposed on the base substrate and proximate to, and operatively associated with the at least one ink chamber and the at least one orifice;
wherein the ink chamber contains a dye sublimation ink, including:
a disperse dye colorant dispersion;
a primary solvent selected from the group consisting of glycerol, ethoxylated glycerol, 2-methyl-1,3-propanediol, dipropylene glycol, and combinations thereof;
a surfactant selected from the group consisting of nonionic surfactants, anionic surfactants, and combinations thereof;
an additive selected from the group consisting of a buffer, a biocide, a chelating agent, and combinations thereof; and
a balance of water; and
a printhead controller, operatively connected to the heating resistor, to activate an electrical current to pass the electrical current through the heating resistor to apply an operating energy that includes a margin over a turn-on energy (TOE) for the printhead, wherein the margin ranges from about 10% to about 25% over the TOE.

15. The thermal inkjet printing system as defined in claim 14 wherein the margin is about 15% over the TOE.

* * * * *